US00RE43303E

(19) United States
(12) Reissued Patent
Browne

(10) Patent Number: US RE43,303 E
(45) Date of Reissued Patent: Apr. 10, 2012

(54) PARASOL

(76) Inventor: Kathy Browne, Canton, MI (US)

(21) Appl. No.: 29/321,921

(22) Filed: Jul. 25, 2008

Related U.S. Patent Documents

Reissue of:

(64) Patent No.: Des. 526,476
Issued: Aug. 15, 2006
Appl. No.: 29/221,440
Filed: Jan. 18, 2005

U.S. Applications:

(62) Division of application No. 29/208,087, filed on Jun. 24, 2004, now Pat. No. Des. 513,118.

(51) LOC (9) Cl. ..... 03-01

(52) U.S. Cl. ..... D3/5

(58) Field of Classification Search ..... D3/5–6, D3/10–17; 135/98, 15.1, 16, 20.1, 25.1, 135/27; 297/184.16
See application file for complete search history.

(56) References Cited

U.S. PATENT DOCUMENTS

| | | | | |
|---|---|---|---|---|
| D398,443 | S * | 9/1998 | Bolle | D3/5 |
| 6,220,261 | B1 * | 4/2001 | Glatz | 135/20.1 |
| 2002/0083969 | A1 * | 7/2002 | Tung | 135/98 |

* cited by examiner

*Primary Examiner* — Robert Delehanty
(74) *Attorney, Agent, or Firm* — Harness, Dickey & Pierce, P.L.C.

(57) CLAIM

The ornamental design for [an umbrella] *a* parasol [for patio or beach use], as shown and described.

DESCRIPTION

FIG. 1 is a side perspective view of [an umbrella] *a* parasol [for patio or beach use] showing my new design in condition of use with a curved pole and stand; and,
FIG. 2 is a front perspective view thereof shown in condition of use with an ornamental endcap, partial pole and crankshaft. The broken [line showing of an] *lines depicting the* ornamental endcap, pole, stand, and crankshaft [is] *are* for illustrative purposes only and [forms] *form* no part of the claimed design.

1 Claim, 2 Drawing Sheets

Figure 2:
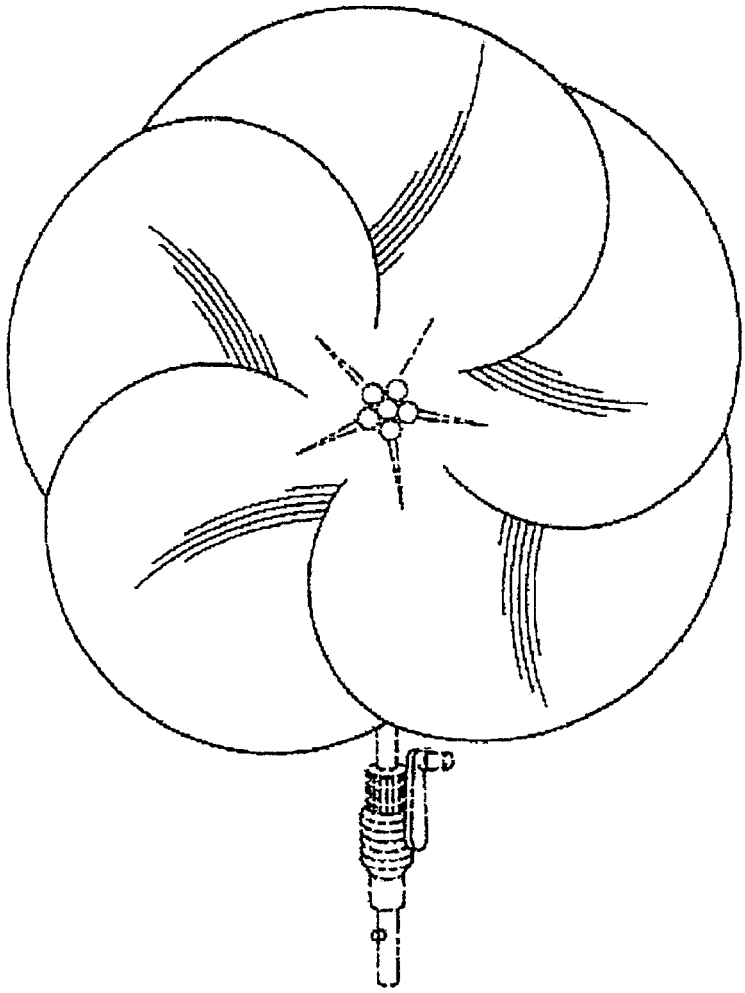

Matter enclosed in heavy brackets [ ] appears in the original patent but forms no part of this reissue; matter printed in italics indicates the additions made by reissue.

AMENDED

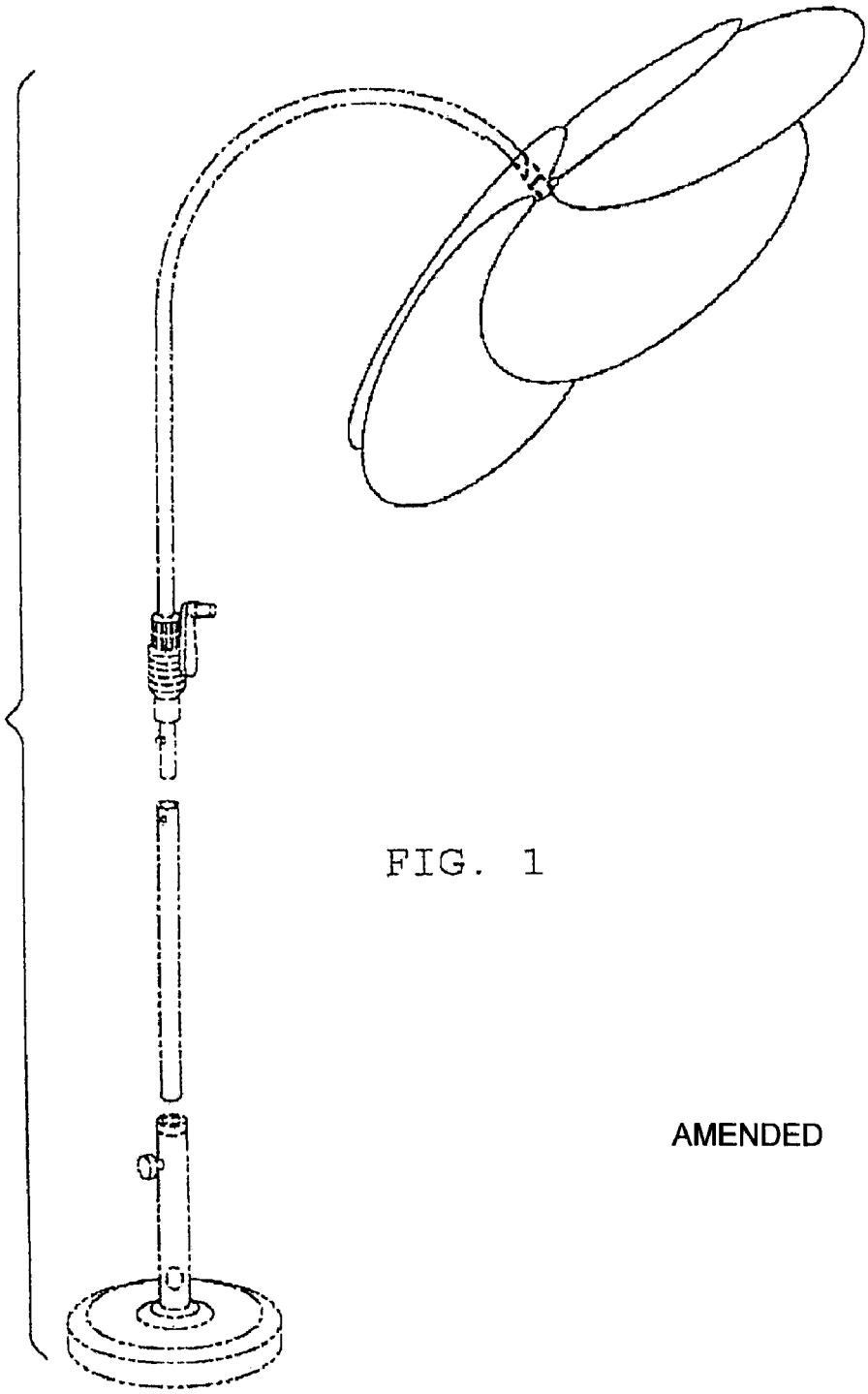
FIG. 1
AMENDED